(12) United States Patent
Li

(10) Patent No.: US 10,645,692 B2
(45) Date of Patent: May 5, 2020

(54) METHOD AND DEVICE FOR INDICATING UPLINK SUBFRAMES ON UNLICENSED FREQUENCY SPECTRUM

(71) Applicant: YULONG COMPUTER TELECOMMUNICATION SCIENTIFIC (SHENZHEN) CO., LTD., Shenzhen (CN)

(72) Inventor: Ming-Ju Li, Shenzhen (CN)

(73) Assignee: YULONG COMPUTER TELECOMMUNICATION SCIENTIFIC (SHENZHEN) CO., LTD., Shenzhen (CN)

(*) Notice: Subject to any disclaimer, the term of this patent is extended or adjusted under 35 U.S.C. 154(b) by 35 days.

(21) Appl. No.: 16/070,521

(22) PCT Filed: Oct. 31, 2016

(86) PCT No.: PCT/CN2016/104056
§ 371 (c)(1),
(2) Date: Jul. 16, 2018

(87) PCT Pub. No.: WO2017/121174
PCT Pub. Date: Jul. 20, 2017

(65) Prior Publication Data
US 2019/0297621 A1    Sep. 26, 2019

(30) Foreign Application Priority Data

Jan. 15, 2016    (CN) .......................... 2016 1 0032199

(51) Int. Cl.
*H04W 72/04*    (2009.01)
*H04W 16/14*    (2009.01)
(Continued)

(52) U.S. Cl.
CPC .......... *H04W 72/0446* (2013.01); *H04L 5/00* (2013.01); *H04W 16/14* (2013.01); *H04W 72/04* (2013.01); *H04W 72/042* (2013.01); *H04W 72/12* (2013.01)

(58) Field of Classification Search
CPC ..... H04W 16/14; H04W 28/26; H04W 72/04; H04W 72/12
See application file for complete search history.

(56) References Cited

U.S. PATENT DOCUMENTS

2012/0320806 A1* 12/2012 Ji ........................ H04B 7/2656
370/280
2014/0334389 A1    11/2014 Abdel-Samad et al.
(Continued)

FOREIGN PATENT DOCUMENTS

CN    104540230 A    4/2015
CN    104796920 A    7/2015
(Continued)

*Primary Examiner* — Marsha D Banks Harold
*Assistant Examiner* — Elton Williams
(74) *Attorney, Agent, or Firm* — ScienBiziP, P.C.

(57) ABSTRACT

The embodiments of the present disclosure provide a method for indicating uplink subframes on an unlicensed frequency spectrum. The method includes: acquiring configuration information of allocated uplink subframes and a timing position of a current subframe; setting a preset first ordinal number of subframe after the current subframe as a first uplink subframe after the current subframe; and sending indication signaling in a preset second number of subframes before the set first uplink subframe, a terminal that receives the indication signaling acquiring a timing position of the uplink subframes according to the indication signaling. The method for indicating uplink subframes on an unlicensed frequency spectrum extends the TDD frame structure, so that the TDD frame structure is more flexible to adapt to
(Continued)

more transmission environments, and improves transmission efficiency.

15 Claims, 4 Drawing Sheets

(51) Int. Cl.
*H04W 72/12* (2009.01)
*H04L 5/00* (2006.01)

(56) References Cited

U.S. PATENT DOCUMENTS

2015/0349931 A1* 12/2015 Damnjanovic ....... H04L 5/0007
 370/280
2016/0323852 A1* 11/2016 Golitschek Edler von
 Elbwart ............ H04W 72/0446
2018/0302926 A1* 10/2018 Bhorkar .............. H04W 28/065

FOREIGN PATENT DOCUMENTS

| CN | 105050190 A | 11/2015 |
| CN | 105722225 A | 6/2016 |

* cited by examiner

METHOD AND DEVICE FOR INDICATING UPLINK SUBFRAMES ON UNLICENSED FREQUENCY SPECTRUM

CROSS-REFERENCE TO RELATED APPLICATIONS

The present disclosure claims a priority of a Chinese patent application, which is filed to Chinese Patent Office on Jan. 15, 2016, named "method and device for indicating uplink subframes on unlicensed frequency spectrum," and numbered 201610032199.5. All contents of Chinese patent application are hereby incorporated by reference in the present application.

FIELD

The present disclosure relates to communication technology, in particular to a method and a device for indicating uplink subframes on an unlicensed frequency spectrum.

BACKGROUND

With increasing of communication traffic, 3rd Generation Partnership Project (3GPP) licensed frequency spectrums become insufficient to provide higher network capacity. In order to further improve the utilization of frequency spectrum resources, unlicensed frequency spectrum such as 2.4 GHz and 5 GHz frequency bands can already be used, in the prior art. These unlicensed frequency spectrums are currently mainly used by Wi-Fi, BLUETOOTH™, radar, medical, and other systems. In order to use the Long Term Evolution (LTE) standard on unlicensed frequency bands, 3GPP proposed a concept of LTE Assisted Access (LAA) to use unlicensed frequency spectrums with the help of LTE licensed frequency spectrums. The unlicensed frequency spectrum can have two working modes. One is the supplemental downlink (SDL), which has only downlink transmission subframes; the other is the time-division duplex (TDD) mode, and both uplink and downlink include transmitting subframes.

In addition, existing access technologies on an unlicensed frequency spectrum, such as WI-FI, are vulnerable to interference. In order to avoid interference, the Wi-Fi system is designed with many interference avoidance rules, such as carrier sense multiple access/collision detection (CSMA/CD) method. The basic principle of the CSMA/CD method is to monitor whether there are other access points (APs) or terminals on the periphery sending/receiving signaling or data before an AP of Wi-Fi or a terminal sends signaling or data. If there are other APs or terminals on the periphery which are sending/receiving signaling or data, monitoring is continued until no signaling or data is sent or received. Otherwise, if there are no other APs or terminals on the periphery that are sending/receiving signaling or data, a random number is generated as a waiting time. During the waiting time, if no signaling or data transmission is detected, the AP or the terminal may begin sending signaling or data after the waiting time is elapsed.

Good orthogonality in the LTE network ensures a low interference level, thus there is no need to consider whether there are other base stations or other users around which are transmitting data, in the uplink and downlink transmissions of the base station and the user. If the LTE is used on an unlicensed frequency band, there is no need to consider whether other devices are using the unlicensed frequency band. In such a situation, Wi-Fi device is subjected to great interference. As long as there is a service, the Wi-Fi device will transmit data. No monitoring rule exists. An idle state of the channel can be detected only after transmission of an LTE service is completed. After that, transmission can be carried out.

Therefore, when the LTE uses the unlicensed frequency band, one key point is to ensure that the LAA can coexist with the existing access technologies (such as Wi-Fi) on a fair-friendly basis. However, there is no listen before talk (LBT) mechanism to avoid collisions in the traditional LTE system. In order to better coexist with Wi-Fi, an LBT mechanism is needed for the LTE. In this way, if a channel is detected to be busy when the LTE uses the unlicensed frequency spectrum, the frequency band cannot be occupied. If the channel is detected to be idle when the LTE network uses the unlicensed frequency spectrum, the frequency band can be occupied.

However, it is found that when the unlicensed frequency spectrum is used in the TDD mode in the conventional technology, since uplink and downlink configurations of the traditional TDD are fixed, a ratio of uplink and downlink time slots is not flexible enough. When downlink data are sent, if uplink and downlink transitions occur due to fixed uplink and downlink configurations, channel resources may be snatched by a Wi-Fi device, and the downlink data transmission process may be interrupted frequently. Therefore, uplink and downlink configurations in a TDD mode in traditional technology are not flexible and the transmission efficiency is not high.

SUMMARY

In order to solve the above-mentioned technical problem that a transmission efficiency is not high because uplink and downlink configurations in a TDD mode in traditional technology only have seven uplink and downlink configurations, which are not flexible, the present disclosure provides a method for indicating uplink subframes on an unlicensed frequency spectrum.

A method for indicating uplink subframes on an unlicensed frequency spectrum is presented. The method includes:

acquiring configuration information of allocated uplink subframes and a timing position of a current subframe;

setting a preset first ordinal number of subframe after the current subframe as a first uplink subframe after the current subframe; and sending indication signaling in a preset second number of subframes before the set first uplink subframe, a terminal that receives the indication signaling acquiring a timing position of the uplink subframes according to the indication signaling.

In one of the embodiments, the second number of subframes are downlink subframes or special subframes including a Downlink Pilot Time Slot (DwPTS).

In one of the embodiments, the indication signaling is Downlink Control Information (DCI) signaling.

In one of the embodiments, the DCI signaling is carried by a common search space of a Physical Downlink Control Channel (PDCCH), the DCI signaling is in a format of 1C, and a cyclic redundancy check (CRC) of the DCI signaling is scrambled by Licensed Assisted Access Radio Network Temporary Identifier (LAA-RNTI).

In one of the embodiments, the first ordinal number is first, second, third, or fourth.

In one of the embodiments, the configuration information of the allocated uplink subframes further includes a preset number of consecutive uplink subframes; and the indication signaling includes a bit sequence composed of 0/1s, and a value of the bit sequence corresponds to a combination of the second number and the number of the consecutive uplink subframes.

In one of the embodiments, the method further includes:

setting a length of the bit sequence of the indication signaling according to a product of a maximum value of the second number and a maximum value of the number of the consecutive uplink subframes.

In one of the embodiments, final one or two symbols of a subframe before the timing position of the first uplink subframe is a position at which an Uplink Pilot Time Slot (UpPTS) of a special subframe is located, and after receiving the indication signaling and obtaining the timing position of the allocated uplink subframes, the terminal sends a Physical Random Access Channel (PRACH) and/or a Sounding Reference Signal (SRS) at the position of the final one or two symbols of the subframe before the timing position of the first uplink subframe.

In addition, in order to solve the above-mentioned technical problem that a transmission efficiency is not high because uplink and downlink configurations in a TDD mode in the conventional technology only have seven uplink and downlink configurations, which are not flexible, the present disclosure provides a device for indicating uplink subframes on an unlicensed frequency spectrum.

A device for indicating uplink subframes on an unlicensed frequency spectrum, including:

an allocation configuration acquisition module configured to acquire configuration information of allocated uplink subframes and a timing position of a current subframe;

an uplink subframe location module configured to set a preset first ordinal number of subframe after the current subframe as a first uplink subframe after the current subframe; and an indication signaling transmission module configured to send indication signaling in a preset second number of subframes before the set first uplink subframe, a terminal that receives the indication signaling acquiring a timing position of the uplink subframes according to the indication signaling.

In one of the embodiments, the second number of subframes are downlink subframes or special subframes including a Downlink Pilot Time Slot (DwPTS).

In one of the embodiments, the indication signaling is Downlink Control Information (DCI) signaling.

In one of the embodiments, the DCI signaling is carried by a common search space of a Physical Downlink Control Channel (PDCCH), the DCI signaling is in a format of 1C, and a cyclic redundancy check (CRC) of the DCI signaling is scrambled by Licensed Assisted Access Radio Network Temporary Identifier (LAA-RNTI).

In one of the embodiments, the first ordinal number is first, second, third, or fourth.

In one of the embodiments, the configuration information of the allocated uplink subframes further includes a preset number of consecutive uplink subframes; and the indication signaling includes a bit sequence composed of 0/1s, and a value of the bit sequence corresponds to a combination of the second number and the number of the consecutive uplink subframes.

In one of the embodiments, the device further includes an indication signaling setting module configured to set a length of the bit sequence according to a product of a maximum value of the second number and a maximum value of the number of the consecutive uplink subframes.

In one of the embodiments, final one or two symbols of a subframe before the timing position of the first uplink subframe is a position at which an UpPTS of a special subframe is located, and after receiving the indication signaling and obtaining the timing position of the allocated uplink subframes, the terminal sends the PRACH and/or the SRS at the final one or two symbols of the subframe before the timing position of the first uplink subframe.

Implementation of the embodiments of the present disclosure will have the following advantages:

by implementing the method and device for indicating uplink subframes on an unlicensed frequency spectrum, frame structures of TDD frames are no longer limited to the seven frame structures defined in traditional technology, and time slot resources of uplink and downlink subframes can be allocated dynamically in the TDD frames transmitted between a base station and a terminal. Furthermore, the base station can determine whether to allocate uplink subframe resources to the terminal at any time without being limited by the TDD frame structures in traditional technology. Therefore, even if a transmission scenario occurs in which the seven frame structures defined in traditional technology are not applicable, uplink subframes can be dynamically allocated at any time, and the terminal is notified in the above manner to adapt the transmitted TDD frame to the transmission scenario. Therefore, the method and the device for indicating uplink subframes on an unlicensed frequency spectrum can render the frame structure of the TDD frame more dynamic and flexible to adapt to more transmission scenarios and improve transmission efficiency.

BRIEF DESCRIPTION OF THE DRAWINGS

In order to describe the technical solutions in embodiments of the present disclosure or in the prior art more clearly, the following briefly introduces the accompanying drawings needed for describing the embodiments. The accompanying drawings in the following description show some embodiments of the present disclosure, and persons of ordinary skill in the art may still derive other drawings from these accompanying drawings without creative effort.

Wherein.

DETAILED DESCRIPTION

The following clearly and completely describes the technical solutions in the embodiments of the present disclosure with reference to the accompanying drawings in the embodiments of the present disclosure. The described embodiments are a part rather than all of the embodiments of the present disclosure. All other embodiments acquired by persons of ordinary skill in the art based on the embodiments of the present disclosure without creative effort shall fall within the protective scope of the present disclosure.

Figure 1:
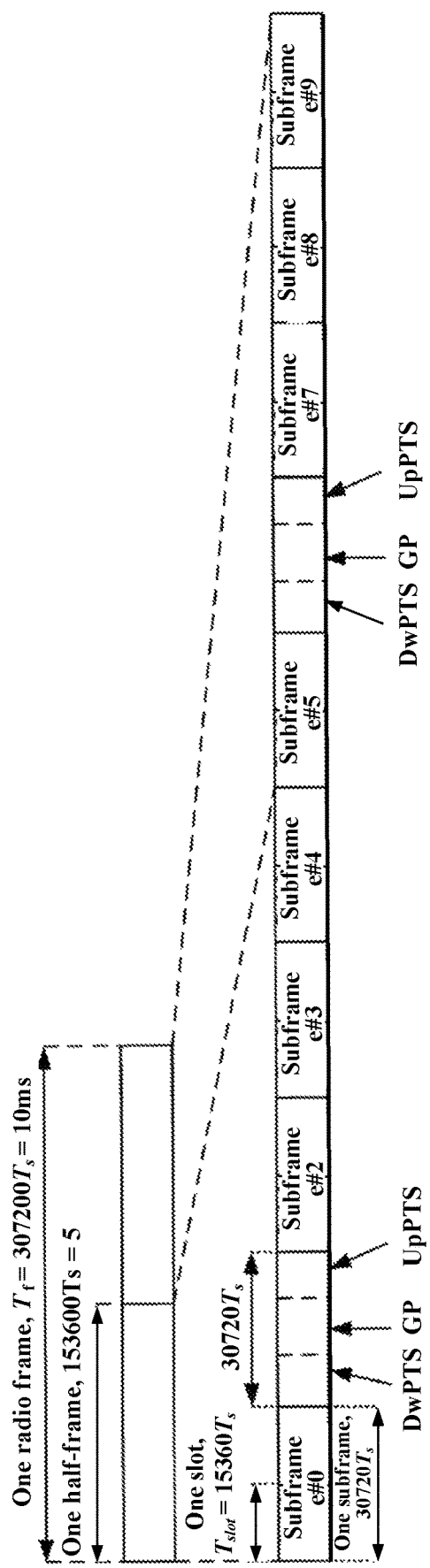
FIG. 1 is a schematic diagram of a frame structure of a TDD frame in traditional technology.

A frame structure of TDD in traditional technology is shown in FIG. 1. A duration of a TDD frame is 10 ms, which is divided into 10 subframes (namely, a duration of each subframe is 1 ms) numbered subframe 0 to subframe 9. The subframes are divided into uplink subframes U, downlink subframes D and special subframes S. In a TDD frame, a sequence position in a subframe sequence is a timing position of time-division resources allocated to the subframes. For example, if a TDD frame is defined as DSUUUDUU, as shown in the figure, then in accordance with the timing sequence, in the first 1 ms of the TDD frame transmission, the time-division resources are allocated to downlink transmission and in the third 1 ms, time-division resources are allocated to uplink transmission.

The allocation of uplink and downlink subframes in a TDD frame in traditional technology is relatively fixed, having seven types of TDD frame structures. The seven types of TDD frame structures define an arrangement sequence of seven types of uplink and downlink subframes in different timing sequences in a TDD frame. Table 1 shows uplink and downlink subframe configurations in the seven types of TDD frame structures in traditional technology:

TABLE 1

| Uplink and downlink configuration number | Downlink to uplink transition point period | Subframe sequence number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 m s | D | S | U | U | U | D | S | U | U | U |
| 1 | 5 m s | D | S | U | U | D | D | S | U | U | D |
| 2 | 5 m s | D | S | U | D | D | D | S | U | D | D |
| 3 | 10 m s | D | S | U | U | U | D | D | D | D | D |
| 4 | 10 m s | D | S | U | U | D | D | D | D | D | D |
| 5 | 10 m s | D | S | U | D | D | D | D | D | D | D |
| 6 | 5 m s | D | S | U | U | U | D | S | U | U | D | where downlink to uplink transition point period is a period of positions of special sub-frames, special subframes S being used to avoid interference from adjacent base stations and users because a downlink to uplink transition is easily influenced by other base stations and users.

However, as seen from Table 1, TDD frame structures in traditional technology are only the seven types. If it is required that time-division resources in a TDD frame or in 10 ms are used for downlink data transmission, an uplink to downlink transition is inevitable in the data transmission process, as seen from the above seven TDD frame structures. The resources may be preempted by other Wi-Fi devices in uplink subframes, and when it transitions into a downlink subframe again, the base station can transmit downlink data only when detecting that other Wi-Fi devices do not preempt the resources. Therefore, the uplink and downlink configurations in the TDD mode in traditional technology are not flexible, and the transmission efficiency is not high.

Thus, in order to solve the above-mentioned technical problem that a transmission efficiency is not high because uplink and downlink configurations in a TDD mode in the conventional technology only have seven uplink and downlink configurations, which are not flexible, the present disclosure provides a method for indicating uplink subframes on an unlicensed frequency spectrum. The method can be implemented by a base station supporting an LAA system.

Figure 2:
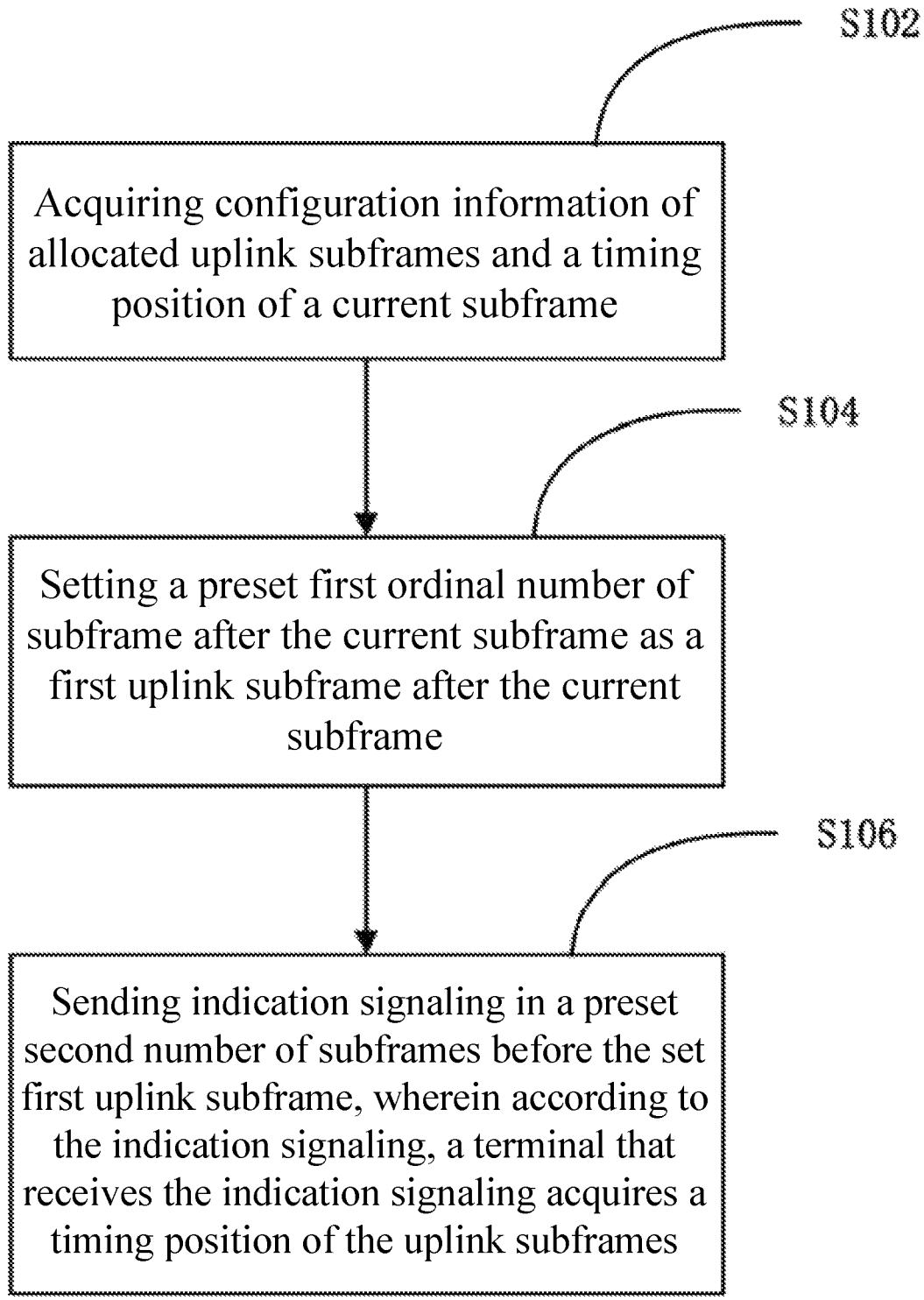
FIG. 2 is a flow chart of a method for indicating uplink subframes on an unlicensed frequency spectrum in one embodiment.

Specifically, as shown in FIG. 2, the method can include:

step S102: acquiring configuration information of allocated uplink subframes and a timing position of a current subframe.

In the embodiment, a base station can determine to allocate uplink subframes at any time. If according to a service, the base station determines to allocate uplink subframes for a terminal at a timing position of a certain subframe, for example, an initial subframe "subframe 0" of a certain TDD frame, the subframe 0 is the current subframe executing the step S102. The configuration information of the uplink subframes allocated by the base station can include a number of consecutive uplink subframes. That is, the base station can allocate multiple consecutive subframes as uplink subframes according to service requirements or transmission scenario requirements.

S104: setting a preset first ordinal number of subframe after the current subframe as a first uplink subframe after the current subframe.

For example, if the base station determines to allocate uplink subframes for a terminal at a timing position of an initial subframe "subframe n" of a certain TDD frame, the base station cannot immediately allocate transmission resources to the terminal to provide an upload data channel. The terminal needs to notify the terminal to upload data at a timing position of the preset first ordinal number of subframe after the current subframe. That is, the base station sets a subframe "subframe n+M" as the first uplink subframe after the subframe n (when n+M>9, going to a next TDD frame, a subframe with a sequence number of n+M−9 is set as an uplink subframe).

Preferably, the preset first ordinal number M is first, second, third, or fourth. In the embodiment, the preset first ordinal number M corresponds to a distance between an uplink grant (UL grant) and a Physical Uplink Shared Channel (PUSCH). If the base station transmits the UL grant in subframe n, the terminal for which time-frequency resources is allocated sends the PUSCH in subframe n+4. Because preparation time required for PUSCH data transmission is longer than other preparation times required for other uplink signals or data such as PRACH, SRS and the like, M is limited to first, second, third, or fourth.

Step S106: sending indication signaling in a preset second number of subframes before the set first uplink subframe, a terminal that receives the indication signaling acquiring a timing position of the uplink subframes according to the indication signaling.

If the current subframe is subframe n, the timing position of the uplink subframes allocated at subframe n is a postion of subframe n+M, namely subframe n+M is the first uplink subframe, as described in the above example. If the preset second number is N, the preset second number of subframes before the configured uplink subframes are subframe n+N−M, subframe n+N−M+1 . . . , and subframe n+M−1. Since all the uplink subframes are dynamically allocated, subframe n+N−M, subframe n+N−M+1 . . . , and subframe n+M−1 are downlink subframes. The base station can send the indication signaling at a timing position of each of subframe n+N−M, subframe n+N−M+1, . . . , and subframe n+M−1.

In addition, the second number of subframes are downlink subframes or special subframes including a Downlink Pilot Time Slot (DwPTS). As shown in FIG. 1, the base station can also transmit data in the DwPTS of the special subframes. That is, the base station can send the indication signaling at a timing position of a downlink subframe D, or send the indication signaling at a timing position of a DwPTS of a special subframe.

Preferably, the indication signaling is Downlink Control Information (DCI) signaling. The DCI signaling used for indicating the terminal can be sent through a licensed frequency band or an unlicensed frequency band. The DCI signaling can be carried by a common search space of a Physical Downlink Control Channel (PDCCH). The DCI signaling can be in a format of 1C. A cyclic redundancy check (CRC) of the DCI signaling can be scrambled by Licensed Assisted Access Radio Network Temporary Identifier (LAA-RNTI).

In the embodiment, the allocation information of the allocated uplink subframes can further include a preset number of consecutive uplink subframes. The indication signaling includes a bit sequence composed of 0/1s, that is a DCI bit sequence in the embodiment. A DCI bit sequence composed of different 1/0 values corresponds to a combination of the second number and the number of the consecutive uplink subframes. A value of a DCI bit sequence denotes identification information of a combination of the second number and the number of the consecutive uplink subframes.

In the embodiment, a length of the bit sequence is set according to a product of a maximum value of the second number and a maximum value of the number of the consecutive uplink subframes.

For example, if the maximum value of the preset second number N is 2, and the maximum value of the number of the consecutive uplink subframes L is 3, then, as shown in the following Table 2, 6 (2×3) cases exist:

TABLE 2

| DCI bit sequence | ID of Combination | Position of initial uplink subframe | Consecutive uplink subframe number |
|---|---|---|---|
| 0 0 0 | 0 | If the current subframe is subframe n, then subframe n + 2 is uplink subframe | 1 |
| 0 0 1 | 1 | If the current subframe is subframe n, then subframe n + 2 is uplink subframe | 2 |
| 0 1 0 | 2 | If the current subframe is subframe n, then subframe n + 2 is uplink subframe | 3 |
| 0 1 1 | 3 | If the current subframe is subframe n, then subframe n + 1 is uplink subframe | 1 |
| 1 0 0 | 4 | If the current subframe is subframe n, then subframe n + 1 is uplink subframe | 2 |
| 1 0 1 | 5 | If the current subframe is subframe n, then subframe n + 1 is uplink subframe | 3 |
| 1 1 0 | 6 | Reserved | |
| 1 1 1 | 7 | Reserved | |

It should be noted that mappings between a DCI bit sequence and a combination of N and L in Table 2 can be preset in accordance with the circumstances, but is not limited to the mappings defined in Table 2. For example, in other embodiments, the bit sequence 111 can also be mapped to a situation in which N is 2 and L is 1, and the bit sequence 000 can be reserved.

When receiving the DCI signaling, the terminal obtains the DCI bit sequence. For example, if the DCI bit sequence is 100, corresponding values of N and L can be found according to the mappings, that is the timing position of the allocated uplink subframes and the number of the continuous uplink subframes are obtained, so that the terminal can send data in the uplink subframes conveniently.

Furthermore, final one or two symbols of a subframe before the timing position of the first uplink subframe is a position in which an UpPTS of a special subframe is located (referring to FIG. 1). Because an UpPTS is used to send a Physical Random Access Channel (PRACH) and a Sounding Reference Signal (SRS), then after receiving the indication signaling and obtaining the timing position of the allocated uplink subframes, the terminal sends the PRACH and/or the SRS at the position of the final one or two symbols of the subframe before the timing position of the first uplink subframe. Also, the PRACH and/or the SRS can be sent in the uplink subframes.

In order to solve the above-mentioned technical problem that a transmission efficiency is not high because uplink and downlink configurations in a TDD mode in the conventional technology only have seven uplink and downlink configurations, which are not flexible, the present disclosure provides a device for indicating uplink subframes on an unlicensed frequency spectrum. The device may include an allocation configuration acquisition module 102, an uplink subframe location module 104, and an indication signaling transmission module 106, where:

the allocation configuration acquisition module 102 is configured to acquire configuration information of allocated uplink subframes and a timing position of a current subframe;

the uplink subframe location module 104 is configured to set a preset first ordinal number of subframe after the current subframe as a first uplink subframe after the current subframe;

the indication signaling transmission module 106 is configured to send indication signaling in a preset second number of subframes before the set first uplink subframe; a terminal receiving the indication signaling acquires a timing position of the uplink subframes according to the indication signaling.

In one embodiment, the second number of subframes are downlink subframes or special subframes including a Downlink Pilot Time Slot (DwPTS).

In one embodiment, the indication signaling is Downlink Control Information (DCI) signaling.

In one embodiment, the DCI signaling is carried by a common search space of a Physical Downlink Control Channel (PDCCH), the DCI signaling is in a format of 1C, and a cyclic redundancy check (CRC) of the DCI signaling is scrambled by licensed Assisted Access Radio Network Temporary Identifier (LAA-RNTI).

In one embodiment, the first ordinal number is first, second, third, or fourth.

In one embodiment, the configuration information of the allocated uplink subframes further includes a preset number of consecutive uplink subframes; and the indication signaling includes a bit sequence composed of 0/1s, and a value of the bit sequence corresponds to a combination of the second number and the number of the consecutive uplink subframes.

Figure 3:
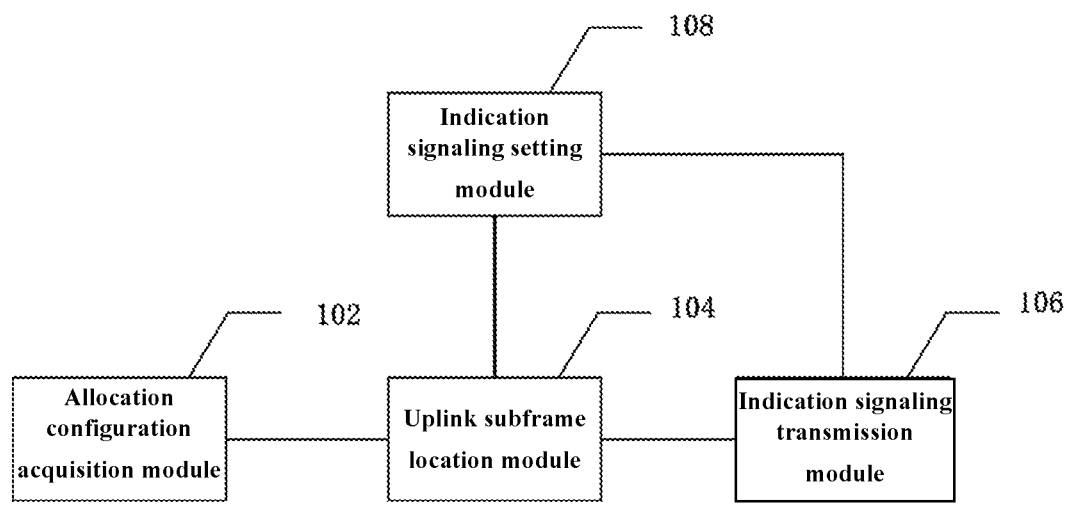
FIG. 3 is a schematic diagram of a device for indicating uplink subframes on an unlicensed frequency spectrum in one embodiment.

In one embodiment, referring to FIG. 3, the device may further include an indication signaling setting module 108 configured to set a length of the bit sequence according to a product of a maximum value of the second number and a maximum value of the number of the consecutive uplink subframes.

In one of the embodiments, final one or two symbols of a subframe before the timing position of the first uplink subframe is a position in which an UpPTS of a special subframe is located. The terminal sends the PRACH and/or the SRS at the position of the final one or two symbols of the subframe before the timing position of the first uplink subframe after receiving the indication signaling and obtaining the timing position of the allocated uplink subframes.

Figure 4:
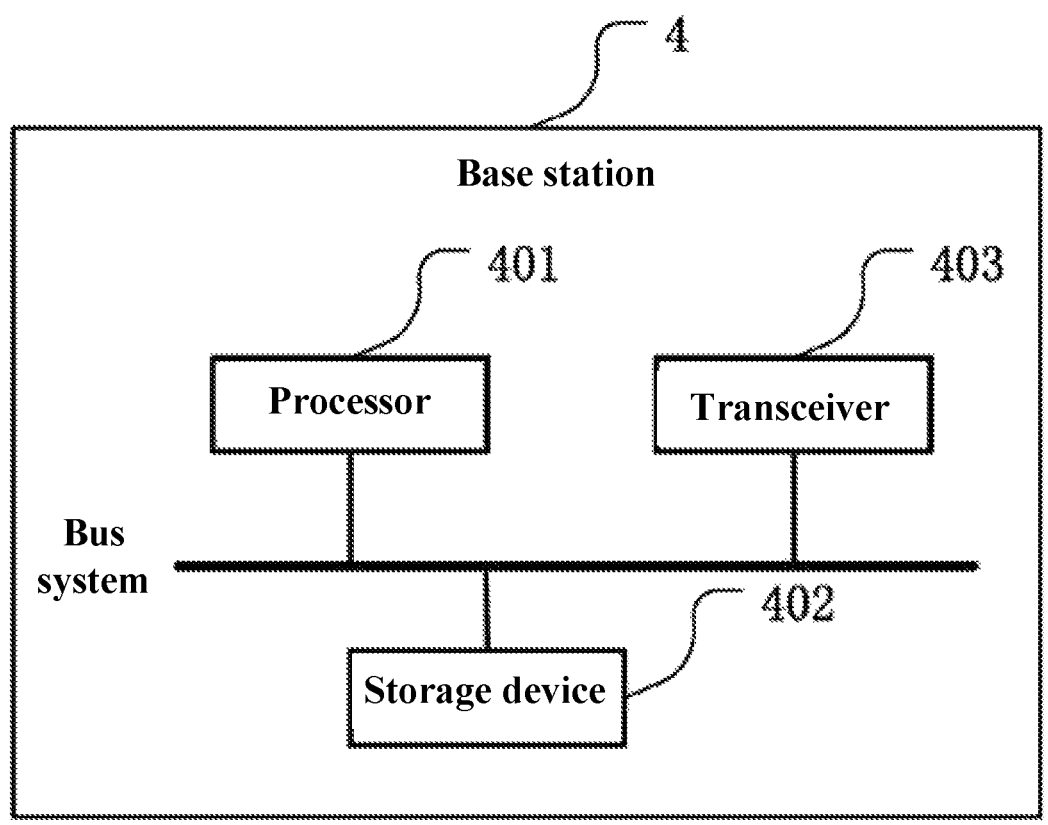
FIG. 4 is a schematic structural diagram of a base station provided in one embodiment.

FIG. 4 is a schematic structural diagram of a base station provided in one embodiment.

Referring to FIG. 4, in one embodiment, the present disclosure provides a schematic structural diagram of a base station. In the embodiment of the present disclosure, the base station 4 can include a processor 401, a storage device 402, and a transceiver 403. The transceiver 403 is used for sending and receiving data with external devices. The number of processors 401 in base station 4 can be one or more. In some embodiments of the present disclosure, the processor 401, the storage device 402, and the transceiver 403 may be connected through a bus system or other means. The base station 4 can be used for executing the method shown in FIG. 2.

The storage device 402 stores program codes, and the processor 401 can invoke the program codes stored in the storage device 402 via the bus system to perform corresponding functions. For example, the modules described in FIG. 3 (e.g., the allocation configuration acquisition module 102, the uplink subframe location module 104, the indication signaling transmission module 106, the indication signaling setting module 108, and the like) are program codes stored in the storage device 402, and are executed by the processor 401. The functions of the modules are thus realized so as to apply the method for indicating uplink subframes on an unlicensed frequency spectrum.

Specifically, the processor 401 acquires configuration information of allocated uplink subframes and a timing position of a current subframe and sets a preset first ordinal number of subframe after the current subframe as a first uplink subframe after the current subframe. Indication signaling in a preset second number of subframes before the set first uplink subframe is sent, and a terminal that receives the indication signaling acquires a timing position of the uplink subframes according to the indication signaling.

In a further embodiment, the subframes are downlink subframes or special subframes including a Downlink Pilot Time Slot (DwPTS).

In a further embodiment, the indication signaling is Downlink Control Information (DCI) signaling.

In a further embodiment, the DCI signaling is carried by a common search space of a Physical Downlink Control Channel (PDCCH), the DCI signaling is in a format of 1C, and a cyclic redundancy check (CRC) of the DCI signaling is scrambled by Licensed Assisted Access Radio Network Temporary Identifier (LAA-RNTI).

In a further embodiment, the first ordinal number is first, second, third, or fourth.

In a further embodiment, the configuration information of the allocated uplink subframes further includes a preset number of consecutive uplink subframes. The indication signaling includes a bit sequence composed of 0/1s, and a value of the bit sequence corresponds to a combination of the second number and the number of the consecutive uplink subframes.

In a further embodiment, the processor 401 sets a length of the bit sequence according to a product of a maximum value of the second number and a maximum value of the number of the consecutive uplink subframes.

In a further embodiment, final one or two symbols of a subframe before the timing position of the first uplink subframe is a position in which an UpPTS of a special subframe is located. After receiving the indication signaling and obtaining the timing position of the allocated uplink subframes, the terminal sends the PRACH and/or the SRS at the position of the final one or two symbols of the subframe before the timing position of the first uplink subframe.

Implementation of the embodiments of the present disclosure will have the following advantages:

by implementing the method and device for indicating uplink subframes on an unlicensed frequency spectrum, frame structures of TDD frames are no longer limited to the seven frame structures defined in traditional technology. Time slot resources of uplink and downlink subframes can be allocated dynamically in the TDD frames transmitted between a base station and a terminal. Furthermore, the base station can determine whether to allocate uplink subframe resources to the terminal at any time without being limited by the TDD frame structures in traditional technology. Therefore, even if a transmission scenario occurs in which the seven frame structures defined in traditional technology are not applicable, uplink subframes can be dynamically allocated at any time, and the terminal is notified in the above manner to adapt the transmitted TDD frame to the transmission scenario. Therefore, the method and the device for indicating uplink subframes on an unlicensed frequency spectrum can make the frame structure of the TDD frame more dynamic and flexible to adapt to more transmission scenarios and improve transmission efficiency.

The above mentioned descriptions are merely preferred embodiments of the present disclosure, and should not limit the scope of the present disclosure. Thus, any modification and equivalent according to the claims of the present disclosure, are still within the scope of the present disclosure.

What is claimed is:

1. A method for indicating uplink subframes on an unlicensed frequency spectrum, comprising:
    acquiring configuration information of allocated uplink subframes and a timing position of a current subframe, wherein the configuration information of the allocated uplink subframes comprises a preset number of consecutive uplink subframes;
    setting a preset first ordinal number of subframe after the current subframe as a first uplink subframe after the current subframe; and
    sending indication signaling in a preset second number of subframes before the set first uplink subframe, a terminal that receives the indication signaling acquiring a timing position of the uplink subframes according to the indication signaling, wherein the indication signaling comprises a bit sequence composed of 0/1s, and a value of the bit sequence corresponds to a combination of the second number and the number of the consecutive uplink subframes;
    setting a length of the bit sequence of the indication signaling according to a product of a maximum value of the second number and a maximum value of the number of the consecutive uplink subframes.

2. The method for indicating uplink subframes on an unlicensed frequency spectrum according to claim 1, wherein the second number of subframes are downlink subframes or special subframes comprising a Downlink Pilot Time Slot (DwPTS).

3. The method for indicating uplink subframes on an unlicensed frequency spectrum according to claim 1, wherein the indication signaling is Downlink Control Information (DCI) signaling.

4. The method for indicating uplink subframes on an unlicensed frequency spectrum according to claim 3, wherein the DCI signaling is carried by a common search space of a Physical Downlink Control Channel (PDCCH), the DCI signaling is in a format of 1C, and a cyclic redundancy check (CRC) of the DCI signaling is scrambled by Licensed Assisted Access Radio Network Temporary Identifier (LAA-RNTI).

5. The method for indicating uplink subframes on an unlicensed frequency spectrum according to claim 1, wherein the first ordinal number is first, second, third, or fourth.

6. The method for indicating uplink subframes on an unlicensed frequency spectrum according to claim 1, wherein final one or two symbols of a subframe before the timing position of the first uplink subframe is a position at which an Uplink Pilot Time Slot (UpPTS) of a special subframe is located, and after receiving the indication signaling and obtaining the timing position of the allocated uplink subframes, the terminal sends a Physical Random Access Channel (PRACH) and/or a Sounding Reference Signal (SRS) at the position of the final one or two symbols of the subframe before the timing position of the first uplink subframe.

7. A base station for indicating uplink subframes on an unlicensed frequency spectrum, comprising:
a processor; and
a storage device storing a plurality of instructions, which when executed by the processor, causes the processor to:
acquire configuration information of allocated uplink subframes and a timing position of a current subframe, wherein the configuration information of the allocated uplink subframes comprises a preset number of consecutive uplink subframes;
set a preset first ordinal number of subframe after the current subframe as a first uplink subframe after the current subframe; and
send indication signaling in a preset second number of subframes before the set first uplink subframe, a terminal that receives the indication signaling acquiring a timing position of the uplink subframes according to the indication signaling, wherein the indication signaling comprises a bit sequence composed of 0/1s, and a value of the bit sequence corresponds to a combination of the second number and the number of the consecutive uplink subframes;
setting a length of the bit sequence of the indication signaling according to a product of a maximum value of the second number and a maximum value of the number of the consecutive uplink subframes.

8. The base station for indicating uplink subframes on an unlicensed frequency spectrum according to claim 7, wherein the second number of subframes are downlink subframes or special subframes comprising a Downlink Pilot Time Slot (DwPTS).

9. The base station for indicating uplink subframes on an unlicensed frequency spectrum according to claim 7, wherein the indication signaling is Downlink Control Information (DCI) signaling.

10. The base station for indicating uplink subframes on an unlicensed frequency spectrum according to claim 9, wherein the DCI signaling is carried by a common search space of a physical Downlink Control Channel (PDCCH), the DCI signaling is in a format of 1C, and a cyclic redundancy check (CRC) of the DCI signaling is scrambled by Licensed Assisted Access Radio Network Temporary Identifier (LAA-RNTI).

11. The base station for indicating uplink subframes on an unlicensed frequency spectrum according to claim 7, wherein the first ordinal number first, second, third, or fourth.

12. The base station for indicating uplink subframes on an unlicensed frequency spectrum according to claim 7, wherein final one or two symbols of a subframe before the timing position of the first uplink subframe is a position at which an Uplink Pilot Time Slot (UpPTS) of a special subframe is located, and after receiving the indication signaling and obtaining the timing position of the allocated uplink subframes, the terminal sends a Physical Random Access Channel (PRACH) and/or a Sounding Reference Signal (SRS) at the position of the final one or two symbols of the subframe before the timing position of the first uplink subframe.

13. A non-transitory storage medium having stored thereon instructions that, when executed by a processor of a base station, causes the processor to:
acquire configuration information of allocated uplink subframes and a timing position of a current subframe, wherein the configuration information of the allocated uplink subframes comprises a preset number of consecutive uplink subframes;
set a preset first ordinal number of subframe after the current subframe as a first uplink subframe after the current subframe; and
send indication signaling in a preset second number of subframes before the set first uplink subframe, a terminal that receives the indication signaling acquiring a timing position of the uplink subframes according to the indication signaling, wherein the indication signaling comprises a bit sequence composed of 0/1s, and a value of the bit sequence corresponds to a combination of the second number and the number of the consecutive uplink subframes;
set a length of the bit sequence of the indication signaling according to a product of a maximum value of the second number and a maximum value of the number of the consecutive uplink subframes.

14. The non-transitory storage medium of claim 13, wherein the subframes are downlink subframes or special subframes comprising a Downlink Pilot Time Slot (DwPTS).

15. The non-transitory storage medium of claim 13, wherein the indication signaling is Downlink Control Information (DCI) signaling.

* * * * *